(12) United States Patent
Hino

(10) Patent No.: US 6,547,691 B2
(45) Date of Patent: Apr. 15, 2003

(54) SHIFT CONTROL SYSTEM FOR CONTINUOUSLY VARIABLE TRANSMISSION

(75) Inventor: Akira Hino, Fuji (JP)

(73) Assignee: Jatco Transtechnology Ltd. (JP)

( * ) Notice: Subject to any disclaimer, the term of this patent is extended or adjusted under 35 U.S.C. 154(b) by 0 days.

(21) Appl. No.: 09/920,680

(22) Filed: Aug. 2, 2001

(65) Prior Publication Data

US 2002/0022547 A1 Feb. 21, 2002

(30) Foreign Application Priority Data

Aug. 2, 2000 (JP) ........................................ 2000-234251

(51) Int. Cl.[7] .............................................. F16H 61/18
(52) U.S. Cl. ........................... 477/37; 477/45; 477/141; 701/56; 74/513
(58) Field of Search ............................. 477/37, 44, 45, 477/46, 141; 74/513, 514, 560; 701/55, 56

(56) References Cited

U.S. PATENT DOCUMENTS

| | | | | |
|---|---|---|---|---|
| 4,651,595 A | * | 3/1987 | Miyawaki | 474/12 |
| 4,833,944 A | * | 5/1989 | Tanaka | 477/139 |
| 5,419,128 A | * | 5/1995 | Asano et al. | 60/327 |
| 5,812,050 A | * | 9/1998 | Figgins | 123/396 |
| 5,934,152 A | * | 8/1999 | Aschoff et al. | 123/399 |
| 6,167,778 B1 | * | 1/2001 | Kohlen | 74/513 |
| 6,289,762 B1 | * | 9/2001 | Silva | 74/513 |
| 6,305,240 B1 | * | 10/2001 | Hannewald et al. | 74/513 |

* cited by examiner

Primary Examiner—Ankur Parekh
(74) Attorney, Agent, or Firm—Rossi & Associates

(57) ABSTRACT

A shift control system for a continuously variable transmission has a target gear ratio corresponding value calculating device for calculating a target gear ratio corresponding value of the continuously variable transmission according to at least a throttle opening, a shift control device for controlling a gear ratio of the continuously variable transmission so that the target gear ratio corresponding value can be obtained. It further has a reactive force applying device disposed on an accelerator pedal and applying a reactive force, which increases according to an increase of the accelerator pedal opening, to a pedal depression force of a driver in a large accelerator pedal opening range.

5 Claims, 4 Drawing Sheets

SHIFT CONTROL SYSTEM FOR CONTINUOUSLY VARIABLE TRANSMISSION

BACKGROUND OF THE INVENTION

1. Field of the Invention

The present invention relates to a shift control system for a continuously variable transmission and, more particularly, to a shift control at the time of a kick-down operation in a continuously variable transmission.

2. Description of the Prior Art

A conventional shift control system for a continuously variable transmission is disclosed in Japanese Patent Application Laid-open No. 9-310757. In this conventional system, the driver's intention of accelerating is detected on the basis of an accelerator pedal opening, and a target gear ratio of the continuously variable transmission is calculated according to a vehicle speed and a throttle opening. The throttle opening is corresponding to the accelerator pedal opening.

If the accelerator pedal opening exceeds a predetermined value, moreover, it is determined that the driver has demanded a rapid acceleration, and thus kick-down acceleration is performed.

According to the aforementioned prior art, however, the kick-down acceleration is determined depending on whether the accelerator pedal opening exceeds a predetermined value. Therefore, when the driver depresses the accelerator pedal in a large amount without intention of a rapid acceleration, it is erroneously determined that the driver demanded a rapid acceleration. This causes the engine speed to increase beyond the driver's intention. In addition, there is a problem of the occurrence of excessive noise accompanying the increase of the engine speed.

SUMMARY OF THE INVENTION

The present invention has been made in view of the aforementioned problem, and its object is to provide a shift control system for a continuously variable transmission capable of more accurately determining acceleration intention of a driver without determining it on the basis of an accelerator pedal opening (or depression) only.

According to one aspect of the invention, a shift control system for a continuously variable transmission which has target gear ratio corresponding value calculating means for calculating a target gear ratio corresponding value of the continuously variable transmission according to at least a throttle opening, and shift control means for controlling a gear ratio of the continuously variable transmission so that the target gear ratio corresponding value can be obtained, comprises reactive force applying means disposed on an accelerator pedal and applying a reactive force, which increases according to an increase of the accelerator pedal opening, to a pedal depression force of a driver in a large accelerator pedal opening range.

According to the prior art, even in case where the driver has no intention to accelerate substantially, the accelerator pedal is smoothly opened, and the kick-down acceleration is performed as a result.

This problem may arise in case where the driver does not think "increasing the accelerator pedal opening" means "accelerating" but he thinks "strongly depressing the accelerator pedal (or increasing pushing force)" means "accelerating". In this case, if the accelerator pedal opening is large even though the accelerator pedal is not strongly depressed, a rapid acceleration may be caused.

In the invention, on the contrary, the accelerator pedal is provided with the reactive force applying means for applying reactive force, which increases according to the increase of the accelerator pedal opening, to depression force exerted on the accelerator pedal by the driver in a large accelerator pedal opening range. Thus, when the driver depresses the accelerator pedal, the reactive force is applied to the driver's depression force at the time the accelerator pedal opening exceeds a predetermined opening. Therefore the accelerator pedal is not depressed more than the driver's intention, and a stable acceleration can be attained.

Preferably, the reactive force applying means is provided with a kick-down detector for detecting a kick-down accelerating operation of the driver, and the target gear ratio corresponding value calculating means has: a first target gear ratio corresponding value calculation map for an ordinary control in which a target primary revolution speed in relation to a vehicle speed is set for each throttle opening and a second target gear ratio corresponding value calculation map for kick-down acceleration in which a target input speed is set to a higher value relative to the target gear ratio corresponding value calculation map for an ordinary control. And the shift control means controls a gear ratio so as to obtain a target gear ratio corresponding value-which is calculated by using the first map for an ordinary control when the kick-down detector detects no kick-down operation and so as to obtain a target gear ratio corresponding value which is calculated by using the second map for kick-down acceleration when the kick-down detector detects a kick-down operation.

When the accelerator pedal is more strongly depressed against reactive force applied by the reactive force applying means, it is determined that the driver intends to accelerate rapidly. In this case, controls suiting the driver's intention can be performed by using the target gear ratio corresponding value calculation map for kick-down acceleration.

Further preferably, the kick-down detector is a push type kick-down switch provided in an elastic member and is pushed by the elastic member which is deformed to a predetermined amount by a pushing force given by the accelerator pedal, and thereby detecting a kick-down accelerating operation.

By using such type of kick-down switch, the driver's intention to accelerate can be easily determined without requiring a complicated arrangement.

Further preferably, the shift control means increases a shift speed for changing a gear ratio of the continuously variable transmission when performing a shift control by using the second map for kick-down acceleration.

A shift speed for changing a gear ratio of the continuously variable transmission is increased when the shift control is performed using the second map for kick-down acceleration. When a kick-down acceleration is chosen, the driver is demanding a rapid acceleration. By attaining a target gear ratio faster, therefore, acceleration excellent in response is realized.

Still further preferably, the shift control means adds a correction pressure to a line pressure for an ordinary control when performing a gear ratio control at a high shift speed.

In case of using the belt-type continuously variable transmission, the pulley pressure needs to be rapidly increased for changing the gear ratio at a high speed. In this case, since the correction pressure is added to the line pressure for an ordinary control, the target gear ratio can be attained with good response.

The above and further objects and features of the invention will be more fully apparent from the following description when the same is considered with reference to the accompanying drawings.

BRIEF DESCRIPTION OF THE DRAWINGS

The nature of this invention, as well as other objects and advantages thereof, will be explained in the following with reference to the accompanying drawings, wherein.

DETAILED DESCRIPTION OF THE PREFERRED EMBODIMENT

Here will be described the embodiment of the invention with reference to the accompanying drawings.

Figure 1:
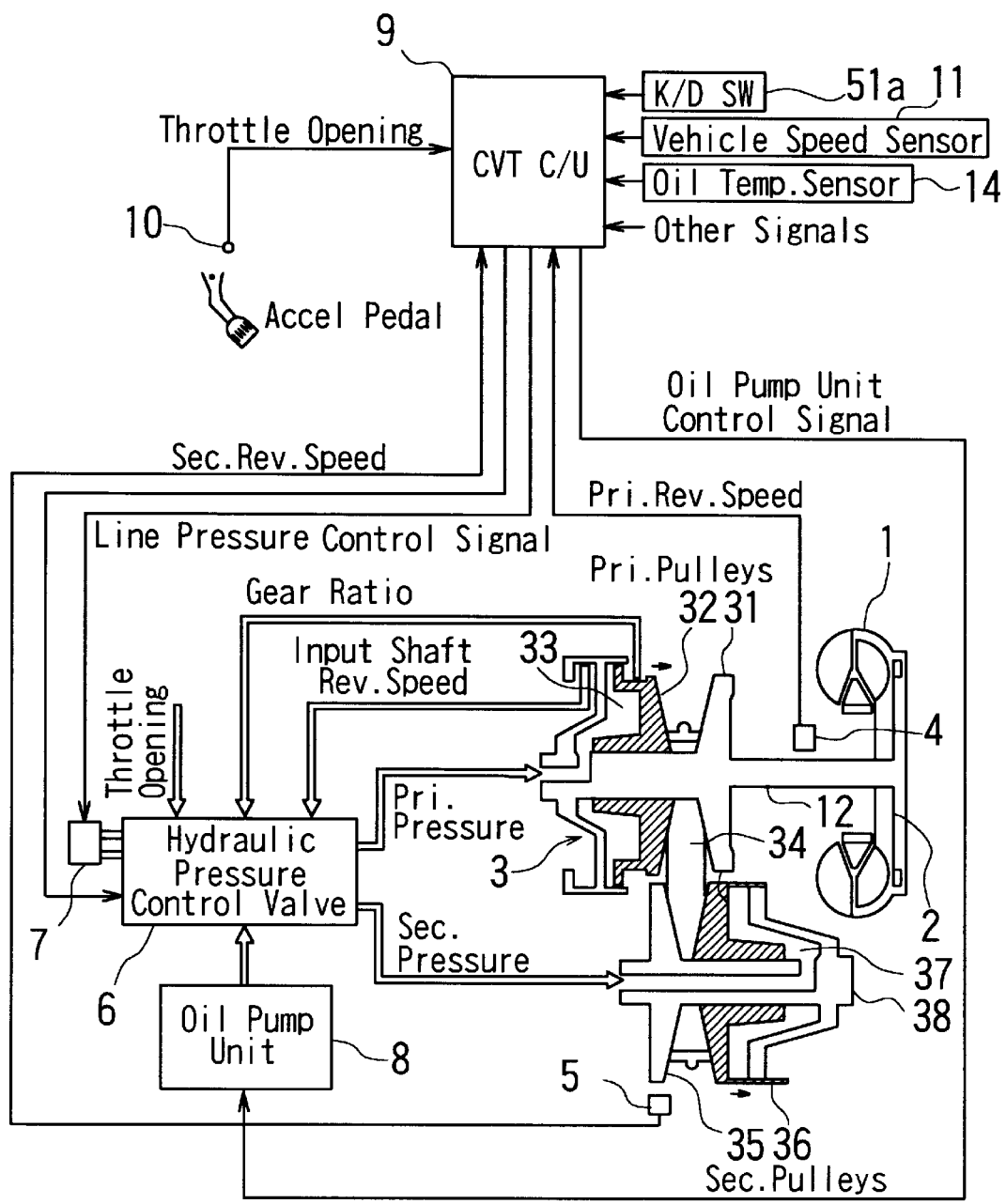
FIG. 1 is a block diagram of main units of a vehicle equipped with a belt-type continuously variable transmission according to the embodiment of the invention.

FIG. 1 is a diagram showing a control system of a belt-type continuously variable transmission 3 (hereinafter referred to as a CVT) according to the embodiment.

To an output shaft of an engine (not-shown), there is connected the torque converter 1 acting as a rotation transmitting mechanism. Moreover, the output shaft of the engine is provided with the rock-up clutch 2 directly connecting the engine and the CVT 3. An output side of the torque converter 1 is connected to an input shaft 12 of the CVT 3. One end of the input shaft 12 is provided with a primary pulley of the CVT 3.

The CVT 3 is comprised of the aforementioned primary pulley, a secondary pulley and a belt 34 transmitting rotation of the primary pulley to the secondary pulley. The primary pulley is comprised of a fixed conical plate 31 rotating integrally with the input shaft 12 and a movable conical plate 32 which is arranged to be opposed to the fixed conical plate 31 to form a V-shaped pulley groove and can be moved by hydraulic pressure acting on a primary pulley cylinder chamber 33 in the axial direction of the input shaft 12. The secondary pulley is mounted on a driven shaft 38. This secondary pulley is comprised of a fixed conical plate 35 rotating integrally with the driven shaft 38 and a movable conical plate 36 which is arranged to be opposed to the fixed conical plate 35 to form a V-shaped pulley groove and can be moved by hydraulic pressure acting on a secondary pulley cylinder chamber 37 in the axial direction of the driven shaft 38.

To the driven shaft 38, there is firmly fixed a drive gear (not shown), which drives a drive shaft extending to not-shown wheels via a pinion mounted on an idler shaft, a final gear and a differential gear unit.

Torque received from the output shaft of the engine is transmitted to the CVT 3 through the torque converter 1 and the input shaft 12. Torque of the input shaft 12 is transmitted to the differential gear unit through the primary pulley, the belt 34, the secondary pulley, the driven shaft 38, the drive gear, an idler gear, the idler shaft, the pinion and the final gear.

In the aforementioned power train, by moving the movable conical plate 32 of the primary pulley and the movable conical plate 36 of the secondary pulley in their respective axial directions, radii of these pulleys coming into contact with the belt 34 are changed. Thereby, a revolution speed ratio of the primary pulley to the secondary pulley (inverse of pulley ratio), that is, a gear ratio can be changed.

The CVT control unit 9 controls the hydraulic pressure applied to the primary pulley cylinder chamber 33 or the secondary pulley cylinder chamber 37, thereby changing the width of the V-shaped pulley grooves of these primary and secondary pulleys.

The CVT control unit 9 receives input signals such as throttle opening from a throttle opening sensor 10, transmission oil temperature from an oil temperature sensor 14, primary revolution speed from the primary speed sensor 4, and secondary revolution speed from the secondary speed sensor 5. The CVT control unit 9 calculates control signals on the basis of these input signals. While a line pressure control signal is outputted to the line pressure solenoid 7, these control signals are outputted to the hydraulic control valve unit 6. Moreover, an oil pump unit control signal is outputted to the oil pump unit 8 supplying hydraulic pressure to the hydraulic control valve unit 6.

The hydraulic control valve unit 6 receives input signals such as throttle opening, gear ratio, input shaft speed (=primary revolution speed), primary oil pressure and so on and supplies control pressure for shift control to the primary pulley cylinder chamber 33 and the secondary pulley cylinder chamber 37.

Figure 2:
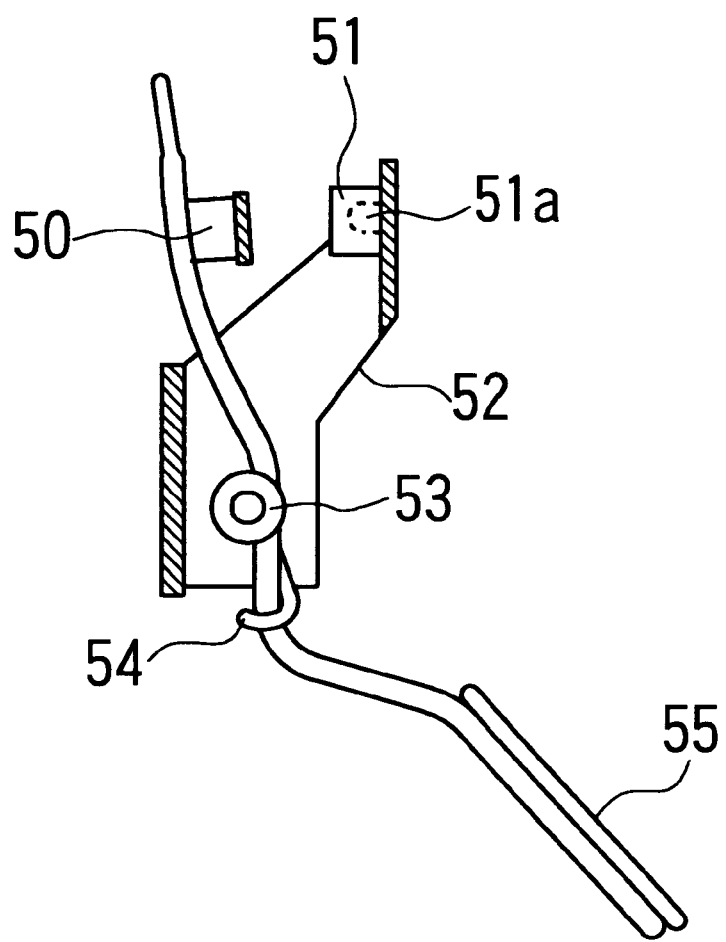
FIG. 2 is a block diagram of a reactive force applying device according to the embodiment of the invention.

FIG. 2 illustrates a reactive force applying device disposed on an accelerator according to the embodiment. First, explanation is made with respect to its construction. On a floor of a vehicle body, there is fixed a bracket 52 equipped with a supporting shaft 53. An accelerator pedal 55 is so arranged as to rotate on the supporting shaft 53. To an opposite end across the supporting shaft 53, of the accelerator pedal 55, an abutting member 50 is fixed integrally therewith. When the accelerator pedal 55 is depressed, this abutting member 50 is abutted onto an elastic member 51 which is firmly fitted to the bracket 52. This elastic member 51 is provided with a kick-down switch 51a. When the pushing force of the abutting member 50 applied to the elastic member 51 is more than a predetermined level, the elastic member 51 is deformed, and thereby the kick-down switch 51a is turned on. Moreover, the accelerator pedal 55 is equipped with a return spring 54 for returning the accelerator pedal 55 to an initial position.

Figure 3:
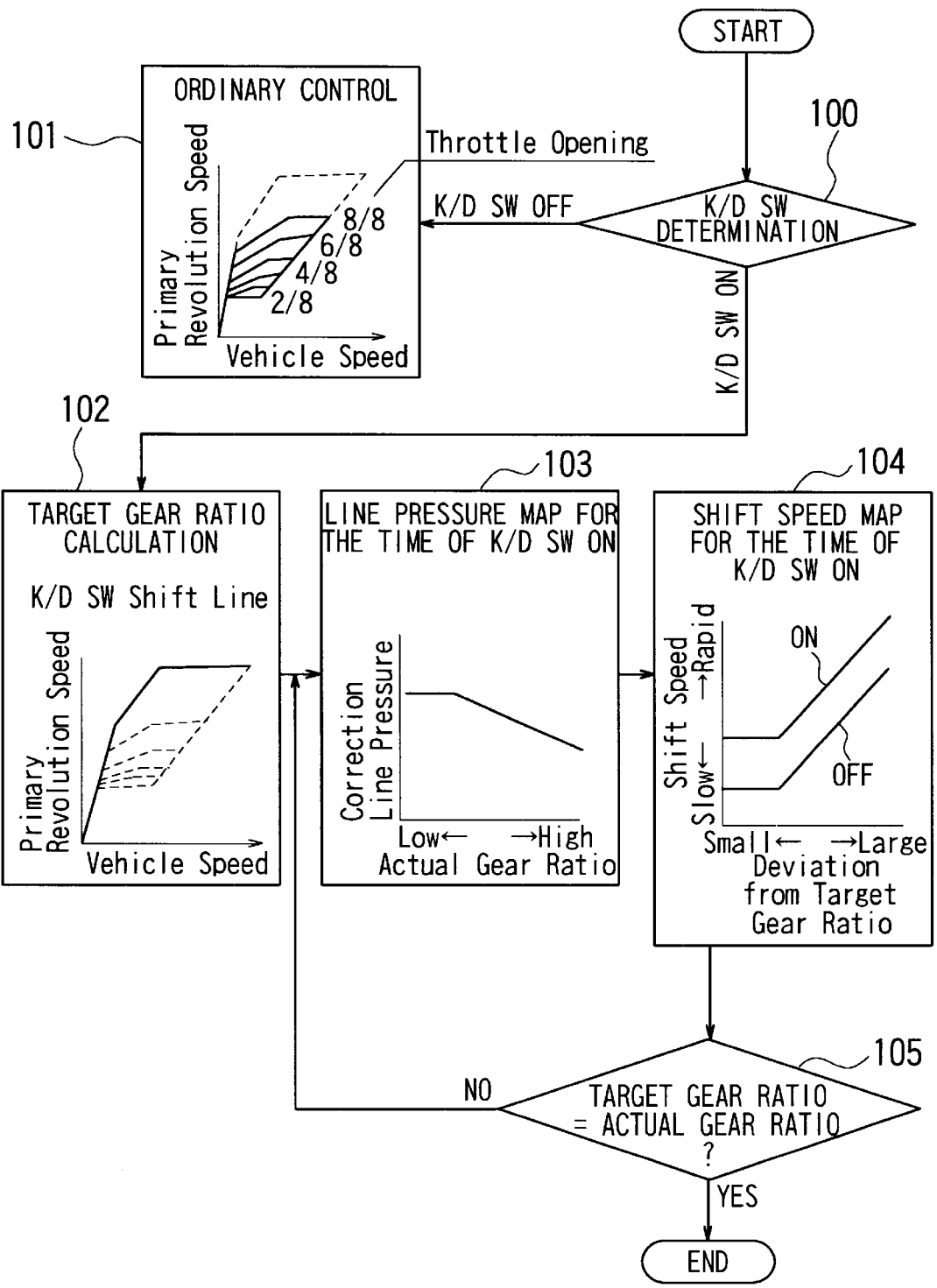
FIG. 3 is a flow chart showing a shift control process during kick-down acceleration according to the embodiment of the invention.
Figure 4:
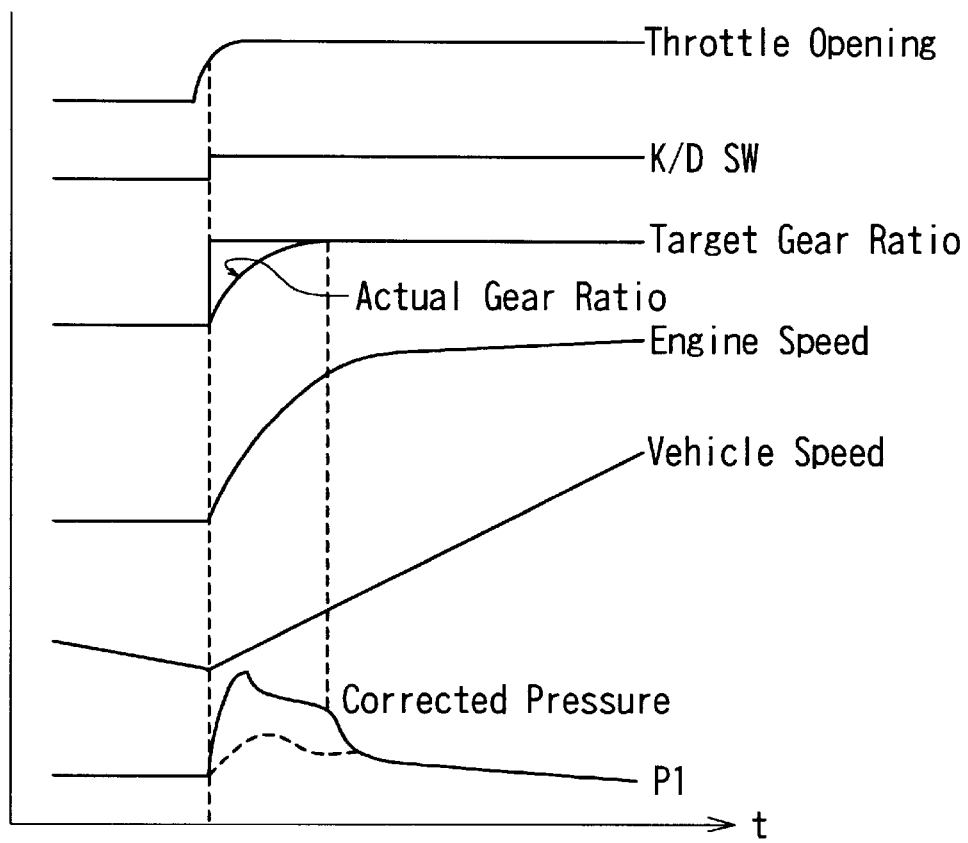
FIG. 4 is a time chart showing a shift control during kick-down acceleration according to the embodiment of the invention.

FIG. 3 is a flow chart of the shift control of the continuously variable transmission according to the embodiment. FIG. 4 is a time chart showing the control of the embodiment.

At step 100, it is determined whether the kick-down switch is turned ON. If it is OFF, the program advances to step 101, and an ordinary shift control is executed. If it is ON, on the contrary, the program advances to step 102.

At the step 102, a target gear ratio is calculated using a shift line map for the time when the kick-down switch is ON. Since the secondary pulley (35, 36) is provided to the driven shaft 38 which is connected to the wheels, a revolution speed of the secondary pulley is proportional to a vehicle speed. Therefore, in the CVT control unit 9 a target gear ratio is calculated based on the primary revolution speed (revolution speed of the primary pulley) obtained from the shift line map.

At step 103, on the basis of a line pressure map for the time when the kick-down switch is ON, a correction line pressure is added to a line, pressure for an ordinary control.

At step 104, a shift speed is calculated by means of a shift speed map for the time when the kick-down switch is ON.

In short, it is determined whether the kick-down switch is turned ON, and if it is OFF, an ordinary shift control is executed.

Here, as shown in the step 101 of the flow chart of FIG. 3, the ordinary shift control is set to be controlled at a lower primary revolution speed compared to the conventional shift characteristics shown by the broken lines in the map.

Therefore, even if the accelerator pedal opening is increased, when the driver has no intention of accelerating rapidly, in other words, when the kick-down switch is OFF, the engine speed is not increased more than necessary, and the occurrence of engine noise can be avoided accordingly.

Next, if the kick-down switch is ON, a target gear ratio is calculated by means of the shift line map for the time when the kick-down switch is ON.

Here, the condition in which the kick-down switch is turned ON indicates that the driver depresses the accelerator pedal against reactive force obtained from the reactive force applying device, and in this case a rapid acceleration is demanded. Therefore, by controlling a shift according to the shift line set at a higher engine speed (i.e. primary revolution speed) as shown in a map in the step 102, a sufficient acceleration can be attained.

Next, correction pressure is added to a line pressure for an ordinary control shown by dotted line in FIG. 4 on the basis of the line pressure map for the time when the kick-down switch is ON. Thereby, target gear ratio can be attained faster, and this permits execution of acceleration excellent in response. Then, shift speed is calculated using the shift speed map for the time when the kick-down switch is ON.

As described above, in the belt-type continuously variable transmission, a rapid increase of pulley pressure is required when speed is rapidly changed. Therefore, the addition of the correction pressure makes it possible to attain the target gear ratio with good response.

As explained hereinbefore, in the shift control system for the continuously variable transmission according to the embodiment, the accelerator pedal 55 is provided with the elastic member 51 acting as the reactive force applying means for applying reactive force to depression force exerted on the accelerator pedal by the driver. Therefore, when the driver depresses the accelerator pedal 55, and accelerator pedal opening exceeds a predetermined opening, the reactive force is applied to the driver's depression force.

According to the prior art, on the other hand, even in case where the driver does not intend to perform acceleration, the accelerator pedal is smoothly opened, and the kick-down acceleration is performed as a result. This problem may arise in case where the driver does not think that "increasing the accelerator pedal opening" means "accelerating" but he thinks that "strongly depressing the accelerator pedal (or increasing pushing force)" means "accelerating". This problem may arise in case where the driver thinks that acceleration is caused by strongly depressing the accelerator pedal (or increasing pushing force), but not by increasing the accelerator pedal opening. In this case, if the accelerator pedal opening is large even when the accelerator pedal is not strongly depressed, a rapid acceleration may be caused. In the embodiment, however, because the reactive force is applied to the driver's depression force, the accelerator pedal is not depressed more than the driver's intention, and a stable acceleration can be attained.

In addition to the provision of the kick-down switch 51*a* for detecting kick-down operations of the driver, the CVT control unit 9 is provided with a target gear ratio calculation map for an ordinary control and a target gear ratio calculation map for kick-down acceleration. When kick-down operation is detected by the kick-down switch 51*a*, a target gear ratio is calculated by means of the target gear ratio calculation map for kick-down acceleration.

This makes it possible to determine whether the driver intends to accelerate rapidly, when the accelerator pedal is depressed more strongly against reactive force obtained by the elastic member 51. Simultaneously, the control using the target gear ratio calculation map for kick-down acceleration allows controls matching the driver's intention.

Moreover, shift range attained by a gear-type automatic transmission is restricted, and the controls must be performed within the range. However, the use of the belt-type continuously variable transmission makes it possible to freely set shift ranges and to execute more efficient shift controls.

When a target gear ratio is calculated using the target gear ratio calculation map for kick-down acceleration, moreover, it is possible to increase shift speed of the continuously variable transmission. In other words, the driver demands rapid acceleration when the driver selects the kick-down acceleration. By attaining a target gear ratio faster, therefore, it is possible to perform acceleration excellent in response.

When shift speed of the continuously variable transmission is increased, moreover, the correction line pressure is added to the line pressure for an ordinary control. In the belt-type continuously variable transmission, in short, the pulley pressure must be rapidly increased, and the addition of the correction line pressure makes it possible to attain the target gear ratio with good response.

In the aforementioned embodiment, the controls during the kick-down acceleration are performed by using the reactive force applying device. However, this reaction force applying device should not be limited to the construction of the first embodiment but may be modified to have other constructions without departing from the purpose of the invention. The reactive force applying device may be provided with no kick-down detecting means, and the CVT control unit 9 may have only one shift control map, instead of two shift control maps as in the aforementioned embodiment. With this construction, also, the driver physically feels reactive force in a large accelerator opening range and therefore can avoid depressing the accelerator pedal to an unexpected level. As a result, a stable acceleration can be attained.

What is claimed is:

1. A shift control system for a continuously variable transmission, comprising:

target gear ratio corresponding value calculating means for calculating a target gear ratio corresponding value of the continuously variable transmission according to at least at throttle opening;

shift control means for controlling a gear ratio of said continuously variable transmission to obtain the target gear ratio corresponding value; and reactive force applying means disposed on an accelerator pedal for applying a reactive force, which increases according to an increase of the accelerator pedal opening, to a pedal depression force of a driver in a large accelerator pedal opening range.

2. A shift control system for a continuously variable transmission according to claim 1, wherein said reactive force applying means is provided with a kick-down detector for detecting a kick-down accelerating operation of the driver, said target gear ratio corresponding value calculating means has a first target gear ratio corresponding value calculation map for an ordinary control in which a target primary revolution speed in relation to a vehicle speed is set for each throttle opening and a second target gear ratio corresponding value calculation map for kick-down acceleration in which a target input speed is set to a higher value relative to said target gear ratio corresponding value calculation map for an ordinary control, and said shift control means controls a gear ratio so as to obtain a target gear ratio corresponding value which is calculated by using said first map for an ordinary control when the kick-down detector detects no kick-down operation and so as to obtain a target gear ratio corresponding value which is calculated by using said second map for kick-down acceleration when the kick-down detector detects a kick-down operation.

3. A shift control system for a continuously variable transmission according to claim 2, wherein said kick-down detector is a kick-down switch provided in an elastic member, said kick-down switch is pushed by said elastic member and detects a kick-down accelerating operation when the elastic member is deformed by a predetermined amount by a pushing force applied by the accelerator pedal.

4. A shift control system for a continuously variable transmission according to claim 3, wherein said shift control means increases a shift speed for changing a gear ratio of said continuously variable transmission when performing a shift control by using the second map for kick-down acceleration.

5. A shift control system for a continuously variable transmission according to claim 4, wherein said shift control means adds a correction pressure to a line pressure for an ordinary control when performing a gear ratio control at a high shift speed.

* * * * *